US012683207B2

(12) United States Patent
Kim et al.

(10) Patent No.: US 12,683,207 B2
(45) Date of Patent: Jul. 14, 2026

(54) METHODS FOR PREPARING CATHODE ACTIVE MATERIAL PRECURSOR MATERIAL AND CATHODE ACTIVE MATERIAL FOR LITHIUM SECONDARY BATTERY, AND CATHODE ACTIVE MATERIAL FOR LITHIUM SECONDARY BATTERY PREPARED ACCORDING TO SAME

(71) Applicant: DONGWOO FINE-CHEM CO., LTD., Jeollabuk-do (KR)

(72) Inventors: Myung-Jin Kim, Gwangju (KR); Ji-Hoon Lee, Gyeonggi-do (KR); Bong-Jin Choi, Chungcheongnam-do (KR)

(73) Assignee: DONGWOO FINE-CHEM CO., LTD., Iksan-Si (KR)

( * ) Notice: Subject to any disclaimer, the term of this patent is extended or adjusted under 35 U.S.C. 154(b) by 838 days.

(21) Appl. No.: 17/802,654

(22) PCT Filed: Oct. 19, 2020

(86) PCT No.: PCT/KR2020/014254
§ 371 (c)(1),
(2) Date: Aug. 26, 2022

(87) PCT Pub. No.: WO2021/172689
PCT Pub. Date: Sep. 2, 2021

(65) Prior Publication Data
US 2023/0013498 A1 Jan. 19, 2023

(30) Foreign Application Priority Data
Feb. 28, 2020 (KR) ........................ 10-2020-0025144

(51) Int. Cl.
| | | |
|---|---|---|
| *H01M 10/54* | (2006.01) | |
| *C01G 53/10* | (2006.01) | |
| *C01G 53/50* | (2025.01) | |
| *C22B 1/00* | (2006.01) | |
| *C22B 3/00* | (2006.01) | |
| *C22B 47/00* | (2006.01) | |
| *H01M 4/505* | (2010.01) | |
| *H01M 4/525* | (2010.01) | |
| *H01M 4/02* | (2006.01) | |

(52) U.S. Cl.
CPC ............ *H01M 10/54* (2013.01); *C01G 53/10* (2013.01); *C01G 53/50* (2013.01); *C22B 1/005* (2013.01); *C22B 23/043* (2013.01); *C22B 47/00* (2013.01); *H01M 4/505* (2013.01);

*H01M 4/525* (2013.01); *C01P 2002/50* (2013.01); *C01P 2006/40* (2013.01); *H01M 2004/028* (2013.01)

(58) Field of Classification Search
None
See application file for complete search history.

(56) References Cited

U.S. PATENT DOCUMENTS

2013/0323142 A1* 12/2013 Shimano ............. H01M 4/0471
423/49

FOREIGN PATENT DOCUMENTS

| | | | | | |
|---|---|---|---|---|---|
| CN | 101383440 | A | * | 3/2009 | |
| CN | 101580317 | | | 11/2009 | |
| CN | 108004419 | | | 5/2018 | |
| CN | 108193050 | | | 6/2018 | |
| CN | 108913873 | A | * | 11/2018 | ............. C22B 1/005 |
| JP | H02271916 | | | 11/1990 | |
| JP | 2001180942 | | | 7/2001 | |
| JP | 2001262242 | | | 9/2001 | |
| KR | 20110036628 | | | 4/2011 | |
| KR | 20150094412 | | | 8/2015 | |
| KR | 20190070181 | | | 6/2019 | |
| KR | 20190123524 | | | 11/2019 | |
| WO | 2017159745 | | | 9/2017 | |
| WO | WO-2019197192 | A1 | * | 10/2019 | ............. C22B 1/005 |
| WO | 2020011765 | | | 1/2020 | |

OTHER PUBLICATIONS

English translation of CN108193050 (Year: 2018).*
Rabah et al. Recovery of nickel, cobalt and some salts from spent Ni-MH batteries. Waste Management 28 (2008) 1159-1167 (Year: 2008).*
International Search Report and Written Opinion from related PCT Application No. PCT/KR2020/014254, dated Oct. 19, 2020, 7 pages.
"Handbook of Modern Chemical Reagents, vol. IV: Inorganic Ionic Chromogenic Agents", edited by Zeng Yun'e et al., Chemical Industry Press, 1st Printing, Sep. 1989, Beijing. Main text, p. 535, Chapter 11: Oxime Compounds.

(Continued)

*Primary Examiner* — Tanisha Diggs
(74) *Attorney, Agent, or Firm* — Brooks, Cameron & Huebsch, PLLC

(57) ABSTRACT

The present disclosure provides: a method for preparing a cathode active material precursor material by using a high-nickel-content waste lithium secondary battery; a method for preparing a cathode active material for a lithium secondary battery, including a cathode active material precursor material prepared by the method for preparing a cathode active material precursor material; and a cathode active material for a lithium secondary battery, prepared according to the method for preparing a cathode active material for a lithium secondary battery.

9 Claims, 1 Drawing Sheet

(56)        References Cited

OTHER PUBLICATIONS

"Chemical Analysis, vol. II", edited by the Analytical Chemistry Teaching and Research Section of Wuhan University, People's Education Press, 1st Edition, Jul. 1977; 1st Printing, Feb. 1978. Main text, pp. 24-25, Section (III): Dimethylglyoxime.
"Analytical Chemistry Experiments" Main text, pp. 349-350, Experiment 4: Determination of Nickel Content in Steel (Nickel Dimethylglyoxime Gravimetric Method).
"Practical Handbook for the Preparation and Calibration of Commonly Used Analytical Reagents and Standard Solutions", Editor-in-Chief: Liu Shiyue, Beijing Founder Electronics Press, Nov. 2004. Main text, p. 172.

* cited by examiner

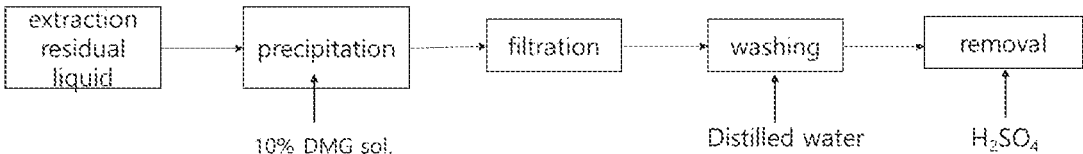

METHODS FOR PREPARING CATHODE ACTIVE MATERIAL PRECURSOR MATERIAL AND CATHODE ACTIVE MATERIAL FOR LITHIUM SECONDARY BATTERY, AND CATHODE ACTIVE MATERIAL FOR LITHIUM SECONDARY BATTERY PREPARED ACCORDING TO SAME

TECHNICAL FIELD

The present disclosure relates to a method for preparing a cathode active material precursor material by using a high-nickel-content waste lithium secondary battery; a method for preparing a cathode active material for a lithium secondary battery using a cathode active material precursor material prepared by the method for preparing a cathode active material precursor material; and a cathode active material for a lithium secondary battery, prepared according to the method for preparing a cathode active material for a lithium secondary battery.

BACKGROUND ART

As technological developments and demands for various types of energy storage devices ranging from subminiature to medium and large sizes, such as mobile devices, notebook computers, wireless devices, electric vehicles, and electric motorcycles, are increasing, the demand for secondary batteries as an energy source is also rapidly increasing. Among such secondary batteries, a lithium secondary battery has been commercialized and widely used because it exhibits a high energy density, a high operating potential, a long cycle life, and a low self-discharge rate.

The lithium secondary battery generally includes a cathode including a cathode active material, an anode including an anode active material, a separator, and an electrolyte, and its charge and discharge are carried out by intercalation/de-intercalation of lithium ions. The lithium secondary battery advantageously exhibits a high energy density, a high electromotive force, and a high capacity, and thus is being applied to various fields.

In particular, it is expected that the use of three-component system (Ni, Co, Mn) cathode active materials will increase significantly in large-capacity lithium secondary batteries, and a layered high-nickel-content cathode material is being developed to realize high energy density and high power while satisfying the requirements for the high capacity as well as the high power at the same time. The more lithium secondary batteries are prepared and used, the more lithium secondary batteries are discarded or disposed. Therefore, the necessity of reprocessing and recycling of the waste lithium secondary batteries is emerging. Further, the secondary battery and material-related industries are in desperate need for low-cost raw materials, low-cost processes, and yield improvement due to fierce price competition, and as the demand for secondary batteries increases, attempts to recycle used batteries and defective products and electrodes generated in the manufacturing process are increasing.

In order to recover and recycle a transition metal such as nickel from the waste lithium secondary battery, the cathode active material is separated from the waste battery, the transition metal, or the like is separated from the separated cathode active material, and then purified, and further, in order to be used again as a raw material for the production of the cathode active material, it should be subject to additional steps.

For example, Korean Patent Laid-Open No. 10-2011-0036628 discloses a method including: obtaining a powder of a valuable metal including lithium, nickel, cobalt and manganese from a waste battery; obtaining a leachate by acid leaching the valuable metal powder in a reducing atmosphere: and obtaining hydroxides of nickel, cobalt and manganese and lithium carbonate ($Li_2CO_3$) from the leachate. However, the method has a problem in that since each transition metal component cannot be separated individually, there are restrictions on the form of application, that a separate transition metal salt must be added to adjust the composition to a desired ratio when utilized as a cathode active material, and that even after the transition metal component is extracted, considerable energy and time are required to remove impurities.

Additionally, among the reprocessing methods of the lithium secondary battery metal oxide-based cathode active material, a method of separately recovering manganese, nickel and cobalt by precipitation and/or solvent extraction of the cathode active material has been studied, and, however, as more high-nickel-content lithium secondary batteries are produced and used, there is an emerging need for development of a method for separating nickel in high purity and high yield from a waste lithium secondary battery having a high nickel content, and a method for using it to prepare a cathode active material.

[Related Art Document] (Patent Document 1) Korean Unexamined Patent Application Publication No. 10-2011-0036628

SUMMARY OF INVENTION

Technical Problem

The present disclosure is conceived to address the above-described drawbacks of the related art, and is intended to provide a method for preparing a cathode active material precursor material by using a high-nickel-content waste lithium secondary battery; a method for preparing a cathode active material for a lithium secondary battery using a cathode active material precursor material prepared by the method for preparing a cathode active material precursor material; and a cathode active material for a lithium secondary battery, prepared according to the method for preparing a cathode active material for a lithium secondary battery.

Solution to Problem

In order to achieve the above objectives, the present disclosure provides a method for preparing a cathode active material precursor material using a waste lithium secondary battery, the method including: (1) obtaining a leachate by leaching a cathode active material of the waste lithium secondary battery; and (2) precipitating nickel by adding 2 to 20 w/v % of an oxime-based material to the leachate.

Also, the present disclosure provides a method for preparing a cathode active material for a lithium secondary battery, which is characterized by obtaining a cathode active material represented by $LiNi_xCo_yMn_zO_2$ ($0<x\leq1$, $0\leq y<1$, $0\leq z<1$, and $x+y+z=1$) by mixing lithium salt with the cathode active material precursor material prepared by the method for preparing a cathode active material precursor material.

The present disclosure provides also a cathode active material for a lithium secondary battery, which is prepared by the method for preparing a cathode active material for a lithium secondary battery.

Advantageous Effects

The method for preparing a cathode active material precursor material according to the present disclosure provides effects that can help recover high-purity nickel with a high recovery rate from a cathode active material of a high-nickel-content waste lithium secondary battery, and that enable the nickel recovery in the form of sulfate, which leads to the direct use of the recovered material in the preparation of the cathode active material without requiring any additional separate step.

BRIEF DESCRIPTION OF DRAWINGS

FIG. 1 is a flowchart for preparing a cathode active material precursor material according to an embodiment of the present disclosure.

DESCRIPTION OF EMBODIMENTS

The present disclosure relates to a method of preparing a cathode active material precursor material using a waste lithium secondary battery, the method including precipitating nickel from a cathode active material of a high-nickel-content waste lithium secondary battery; to a method of preparing a cathode active material for a lithium secondary battery using the cathode active material precursor material prepared by the above preparing method; and to a cathode active material for a lithium secondary battery prepared by the method for preparing a cathode active material for a lithium secondary battery.

Specifically, the method for preparing a cathode active material precursor material according to the present disclosure is characterized by achieving the high concentration of an oxime-based material that conventionally had an extremely low solubility of 1 w/v % or less for water and alcohol, which caused difficulties particularly to its application to the recovery of a high-nickel-content cathode active material, and when it is used in the nickel recovery process, it provides effects that can help recover high-purity nickel with a high recovery rate from a cathode active material of a high-nickel-content waste lithium secondary battery, and that enable the nickel recovery in the form of sulfate, which leads to the direct use of the recovered material in the preparation of the cathode active material without requiring any additional separate step.

In the method for preparing a cathode active material precursor material of the present disclosure, the recover rate of nickel with respect to the cathode active material of the waste lithium secondary battery may be 60% or more, preferably 80% or more, more preferably 85% or more, most preferably 90% or more, and the purity of nickel recovered through the method for preparing the cathode active material precursor material according to the present disclosure may be 90% or more, preferably 99% or more.

Hereinafter, a method for preparing a cathode active material precursor material according to the present disclosure; a method for preparing a cathode active material for a lithium secondary battery using a cathode active material precursor material prepared by the method for preparing a cathode active material precursor material; and a cathode active material for a lithium secondary battery, prepared according to the method for preparing a cathode active material for a lithium secondary battery will be described. However, the present disclosure is not limited thereto.

Method for Preparing a Cathode Active Material Precursor Material

The method for preparing a cathode active material precursor material according to the present disclosure is characterized by including the step of precipitating nickel by adding 2 to 20 w/v % of an oxime-based material as a precipitating agent, and more specifically, the method may include (1) obtaining a leachate by leaching a cathode active material of a waste lithium secondary battery; and (2) precipitating nickel by adding 2 to 20 w/v % of an oxime-based material to the leachate.

(1) Obtaining a Leachate by Leaching a Cathode Active Material of a Waste Secondary Battery In the method for preparing a cathode active material precursor material according to the present disclosure, the cathode active material of a waste lithium secondary battery is not particularly limited as long as it contains nickel or a nickel salt, although it may be a two-component system cathode active material containing nickel and one of cobalt and manganese, or a three-component system cathode active material containing nickel, cobalt and manganese, and preferably, the molar ratio of nickel in the three components may be 50% to 90%, and it may be desired that the mole ratio of nickel is 60% to 80%.

In an example, the cathode active material of a waste lithium secondary battery according to the present disclosure may include a cathode active material represented by the following Formula 1:

$$\text{LiNi}_x\text{Co}_y\text{Mn}_z\text{O}_2 \qquad \text{[Formula 1]}$$

In Formula 1 above, $0.5 \leq x \leq 1$, $0 \leq y \leq 0.3$, $0 \leq z \leq 0.3$, $x+y+z=1$, preferably $0.5 \leq x \leq 0.9$, $0.1 \leq y \leq 0.3$, $0.1 \leq z \leq 0.3$, and $x+y+z=1$.

The material for leaching the cathode active material may include sulfuric acid, hydrogen peroxide, and the like.

Specifically, the cathode active material according to the present disclosure is not particularly limited in terms of the nickel content, although it exhibits an excellent effect in recovering nickel from NCM111 ($\text{LiCo}_{1/3}\text{Ni}_{1/3}\text{Mn}_{1/3}\text{O}_2$) having a relatively low nickel content as well as NCM523 ($\text{LiNi}_{0.5}\text{Co}_{0.2}\text{Mn}_{0.3}\text{O}_2$), NCM622, NCM811, which have had technical difficulties in recovering nickel due to their high nickel contents. Here, NCM523 means that it is made of nickel (N), cobalt (C), and manganese (M) in a ratio of 5:2:3, NCM622 means that it is made of nickel (N), cobalt (C), and manganese (M) in a ratio of 6:2:2, and NCM811 means that it is made of nickel (N), cobalt (C), and manganese (M) in a ratio of 8:1:1.

in addition, the leachate may include Li, Mn, Co, Ni, and the method for preparing a cathode active material precursor material according to the present disclosure may further include extracting manganese from the leachate in step (1), wherein the manganese can be extracted by solvent extraction.

The method for preparing a cathode active material precursor material according to the present disclosure may further include the step of crushing the waste lithium secondary battery as it is and then performing heat treatment on the crushed waste lithium secondary battery, this step being a pretreatment process for obtaining the cathode active material of the waste lithium interest battery.

In the pretreatment process, the step of discharging the waste lithium secondary battery before it is crushed may be further included. When the discharge has been completed, the subsequent valuable metal recovery process can be safely performed even in the atmosphere other than in an inert atmosphere. The discharge may be performed in a discharge solution. Distilled water may be used as the discharge solution. The degree of completion of the discharge can be confirmed through the voltage decrease over time. Most of the electrolyte in the waste lithium secondary battery is removed during the discharge process.

The crushing may be performed by milling, and the milling may be mechanical milling, and specifically, may be performed by at least one selected from the group consisting of a roll-mill, a ball-mill, a jet-mill, a planetary-mill, and an attrition-mill.

The crushed material may have a particle diameter of 1 to 15 μm, preferably 1 to 7 μm, and more preferably 2 to 5 μm.

The pretreatment process may further include a classification step after the crushing, and the crushed material is separated into large fractions of the fine electrode composite powder and other components (anode, cathode, separator) by the classification process, preferably by a sieve, thereby recovering the electrode composite powder from the crushed material.

The pretreatment process may further include the step of gravity separation after the classification, and the separator in the crushed material is removed by the gravity separation of the crushed material, preferably using a rinse tank equipped with a water level, while separating electrode composite, separator, current collector, and the like from one another.

The pretreatment process may further include the step of magnetic separation after the gravity separation, and when stainless steel (SUS) is also included in the waste lithium secondary battery, the stainless steel (SUS) is selectively removed from the crushed material by the magnetic separation.

The pretreatment process may include performing heat treatment after the magnetic separation. The heat treatment is performed for the purpose of removing impurities other than the cathode active material, such as a cathode binder, a cathode conductive material, an anode active material, an anode binder, an anode conductive material, or a pouch, included in the waste lithium secondary battery, and it may be performed in a temperature range of 600° C. to less than 1000° C., preferably 700° C. to 900° C., and more preferably 800° C. to 900° C. When the heat treatment temperature is equal to or greater than 1000° C., even lithium of the cathode active material may be removed.

Additionally, the method for preparing a cathode active material precursor material according to the present disclosure may include the step of further removing remaining impurities, such as a carbon material (anode active material) and copper, by mixing sulfuric acid with the pretreatment material after the heat treatment.

The waste lithium secondary battery includes a cathode, an anode, a separator, and an electrolyte, and may further include a pouch. Specifically, in a waste lithium secondary battery, a separator is interposed between the anode and the cathode, and includes an electrolyte solution with the electrolyte supplied thereto. More specifically, the above-described waste lithium secondary battery may be one that has been manufactured by, for example, sequentially stacking the anode, the separator, and the cathode, and then winding or folding the stack and placing it in a cylindrical or rectangular battery case or pouch, and then injecting an organic electrolyte solution into the battery case or pouch.

The cathode of the waste lithium secondary battery may be one that includes lithium metal or lithium transition metal oxide, and may he one that has been manufactured by a conventional method known in the art. The cathode may be one that has been prepared, for example, by preparing a slurry by mixing and stirring the cathode active material with a solvent, a binder, a conductive material, and a dispersing agent as necessary, and then by applying (coating) the slurs to the cathode current collector, compressing and then drying it.

The cathode active material of the waste lithium secondary battery includes a cathode active material represented by the following Formula 1, and preferably has a high nickel content:

$$LiNi_xCo_yMn_zO_2 \qquad \text{[Formula 1]}$$

In Formula 1 above, $0.5 \leq x \leq 1$, $0 \leq y \leq 0.3$, $0 \leq z \leq 0.3$, $x+y+z=1$, preferably $0.5 \leq x \leq 0.9$, $0.1 \leq y \leq 0.3$, $0.1 \leq z \leq 0.3$, and $x+y+z=1$.

The solvent of the cathode may employ N-methyl-2-pyrrolidone (NMP), acetone, water, or a mixture thereof, and the conductive material of the cathode may employ a conductive auxiliary material such as polyacrylic acid, acetylene black, furnace black, graphite, carbon fiber, or fullerene.

The binder of the cathode serves to firmly adhere the cathode active material particles to each other, and also to firmly adhere the cathode active material to the cathode current collector, and, the binder may employ, for example, polyacrylic acid, polyvinylidene fluoride, polyvinyl alcohol, carboxymethylcellulose (CMC), starch, hydroxypropylcellulose, recycled cellulose, polyvinylpyrrolidone, tetrafluoroethylene, polyethylene, polypropylene, ethylene-propylene-diene terpolymer (EPDM), sulfonated EPDM, styrene butyrene rubber, fluororubber, various copolymers, or the like.

The cathode current collector has a thickness of about 3 μm to about 500 μm, and is not particularly limited as long as it has high conductivity without causing a chemical change in the battery, and may employ one that has been prepared by performing surface treatment on the surface of stainless steel, aluminum, nickel, titanium, heat-treated carbon, aluminum or stainless steel with one selected from the group consisting of carbon, nickel, titanium, silver, and combinations thereof. It is possible to increase adhesion of the cathode active material to the current collector by forming fine irregularities on the surface of the current collector, and the current collector may take various forms such as films, sheets, foils, nets, porous bodies, foams, or non woven fabrics.

The anode of the waste lithium secondary battery may be one that has been manufactured by a conventional method known in the art. The anode may be one that has been prepared, for example, by preparing a slurry by mixing and stirring the anode active material with a solvent, a binder, a conductive material, and a dispersing agent as necessary, and then by applying (coating) the slurry to the anode current collector, compressing and then drying it.

The anode active material may generally include a carbon material, lithium metal, silicon, or tin in which lithium ions can be stored and released. Preferably, it may be a carbon material, and examples of the carbon material may include low crystalline carbon and high crystalline carbon. Representative examples of the low crystalline carbon include soft carbon and hard carbon, and representative examples of highly crystalline carbon include natural graphite, kish graphite, pyrolytic carbon, mesophase pitch based carbon fiber, meso-carbon microbeads, mesophase pitches, and high-temperature calcined carbon such as petroleum and coal tar pitch derived cokes.

The solvent of the anode may employ N-methyl-2-pyrrolidone (NMP), acetone, water, or a mixture thereof, and the conductive material of the anode may employ a conductive auxiliary material such as polyacrylic acid, acetylene black, furnace black, graphite, carbon fiber, or fullerene.

The binder of the anode serves to firmly adhere the anode active material particles to each other, and also to firmly adhere the anode active material to the cathode current collector, and, the binder may employ, for example, polyacrylic acid, polyvinylidene fluoride, polyvinyl alcohol, carboxymethylcellulose (CMC), starch, hydroxypropylcellulose, recycled cellulose, polyvinylpyrrolidone, tetrafluoroethylene, polyethylene, polypropylene, ethylene-propylene-diene terpolymer (EPDM), sulfonated EPDM, styrene butyrene rubber, fluororubber, various copolymers, or the like.

The anode current collector is generally made to have a thickness of about 3 μm to about 500 μm. This anode current collector is not particularly limited as long as it has conductivity without causing a chemical change in the battery, and may include one that has been prepared by performing surface treatment on the surface of copper, stainless steel, aluminum, nickel, titanium, heat treated carbon, copper or stainless steel with carbon, nickel, titanium, or silver, or may include an aluminum-cadmium alloy and the like. Additionally, like the cathode current collector, it is possible to increase adhesion of the anode active material to the anode current collector by forming fine irregularities on the surface thereof, and the anode current collector may be used in various forms such as films, sheets, foils, nets, porous bodies, foams, or non woven fabrics.

The type of the separator of the waste lithium secondary battery is not limited, although this may use a porous substrate made of a polyolefin-based polymer selected from the group consisting of ethylene homopolymer, propylene homopolymer, ethylene-butene copolymer, ethylene-hexene copolymer, and ethylene-methacrylate copolymer; a porous substrate made of a polymer selected from the group consisting of polyester, polyacetal, polyamide, polycarbonate, polyimide, polyetheretherketone, polyethersulfone, polyphenyleneoxide, polyphenylenesulfite, and polyethylenenaphthalene; or a porous substrate formed of a mixture of inorganic particles and a binder polymer. In particular, in order for lithium ions of the lithium ion supply core part to be easily transferred to the external electrode, it is preferable to use a separator made of a non woven fabric material corresponding to a porous substrate made of a polymer selected from the group consisting of polyester, polyacetal, polyamide, polycarbonate, polyimide, polyetheretherketone, polyethersulfone, polyphenyleneoxide, polyphenylenesulfite, polyethylenenaphthalene, and combinations thereof.

The separator employs one that has a pore size of about 0.01 μm to about 10 μm, and a thickness of generally about 5 μm to about 300 μm.

The electrolyte of the waste lithium secondary battery may employ, for example, a gel-type polymer electrolyte using PEO, PVdF, PVdF-HFP, PMMA, PAN, or PVAC; or a solid electrolyte using PEO, polypropylene oxide (PPO), polyethylene imine (PEI), polyethylene sulphide (PES), or polyvinyl acetate (PVAc). Additionally, the electrolyte may employ a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethylmethyl carbonate (EMC), methyl formate (MF), gamma-butyrolactone (γ-BL; γ-butyrolactone), sulfolane (sulfolane), methyl acetate (MA; methylacetate), or methyl propionate (MP). Also, the electrolyte may further include a lithium salt, and the lithium salt may employ, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium Chloroborane, lithium lower aliphatic carboxylate, or lithium tetraphenylborate.

In one embodiment of the present application, the waste lithium secondary battery may employ an organic solid electrolyte andlor an inorganic solid electrolyte together in addition to the separator, but is not limited thereto. In this regard, when the organic solid electrolyte and/or the inorganic solid electrolyte are used, the solid electrolyte may also serve as a separator in some cases, so that the aforementioned separator may not be used.

The organic solid electrolyte may include, without being limited to, for example, a polyethylene derivative, a polyethylene oxide derivative, a polypropylene oxide derivative, a phosphoric acid ester polymer, polyvinyl alcohol, or polyvinylidene fluoride. The inorganic solid electrolyte may include, without being limited to, for example, any one selected from the group consisting of $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and combinations thereof.

(2) Precipitating Nickel

The method for preparing a cathode active material precursor material according to the present disclosure include precipitating nickel by adding 2 w/v % or more, preferably 2 to 20 w/v %, more preferably 10 to 20 w/v % of an oxime-based material to the leachate.

In the present disclosure, the nickel concentration of the leachate may be greater than 10 g/L, preferably equal to or greater than 20 g/L, and more preferably between 20 and 50 g/L. The present disclosure can recover high-purity nickel in a high yield even from a leachate containing a high concentration of nickel of 20 g/L or more.

In the present disclosure, the oxime-based material may be one that includes one or more kinds selected from the group consisting of dimethylglyoxime (DMG), diethylglyoxime, dipropylglyoxime, and ethylmethylglyoxime.

In particular, among the oxime-based materials, aforementioned dimethylglyoxime has been conventionally used as an indicator to check the presence or absence of nickel through color change of the precipitate, but it is difficult to manufacture it at a concentration of 2 w/v % or more, so it was substantially impossible to use it in the process for the recovery of the cathode active material, etc. In the present disclosure, by preparing an oxime-based material with a concentration of 2 w/v % or more that can be used for nickel recovery, and by precipitating the nickel salt through the addition of the high-concentration oxime-based material to a nickel-containing leachate, the oxime-based material can play a role of separating the nickel salt.

In step (2), the oxime-based material of 2 to 20 w/v % may be one that has been obtained through a saponification step. Accordingly, the method for preparing a cathode active material precursor material according to the present disclosure may further include obtaining 2 to 20 w/v % of an oxime-based material by saponifying the oxime-based material in step (2) above. The oxime-based material, which is a material for precipitating nickel in the present disclosure, is originally an organic material having a remarkably low solubility of less than 1 w/v % in a polar solvent such as water. Therefore, in the present disclosure, by improving solubility of the oxime-based material in a polar solvent through the saponification of the oxime-based material, 2 to 20 w/v % of the oxime-based material is obtained.

Specifically, for the saponification of the oxime-based material, the present disclosure may include mixing a polar solvent and an alkaline solution, and then dissolving the oxime-based material to obtain the oxime-based solution. For example, the alkaline solution may include at least one selected from the group consisting of NaOH, KOH, $Ca(OH)_2$, and $NH_4OH$, and the oxime-based material may be in the form of being dissolved in a polar solvent, and the concentration of the oxime-based material may be 2 to 20 w/v %, preferably 5 to 15 w/v %. The polar solvent may employ, for example, at least one selected from the group consisting of water, alcohol, acetone, and carboxylic acid.

In the present disclosure, the oxime-based solution may include one that has been saponified to 40% or more, preferably 50% or more, and it is preferable that the oxime-based material is saponified up to 100% as the Ni content increases. For example, when NCM 523 waste battery is used, 80% or more of nickel can be recovered with 50% saponified oxime-based material, and when the NCM 811 waste battery is used, 80% or more of nickel can be recovered with 100% saponified oxime-based material, but the present disclosure is not limited thereto.

The degree of saponification of the oxime-based solution may be adjusted according to the addition amount of the alkaline solution. For example, when the alkaline solution is added at a weight corresponding to 100% of the number of moles of the oxime-based material, a 50% saponified oxime-based solution can be obtained, and when the alkaline solution is added at a weight corresponding to 200% of the moles of the oxime-based material, a 100% saponified oxime-based solution can be obtained.

The step of precipitating nickel includes obtaining a Ni salt through the precipitation in the leachate using the oxime-based solution when the pH of the leachate is 4 to 6, preferably, pH 6.

In addition, the method for preparing the cathode active material precursor material according to the present disclosure may further include the step of obtaining nickel sulfate $(NiSO_4)$ by treating the precipitated nickel with sulfuric acid in step (2). As the nickel is recovered in the form of sulfate, it can be directly utilized as a precursor of a cathode active material for a lithium secondary battery without a separate treatment process.

In the method for preparing a cathode active material precursor material of the present disclosure, the recovery rate of nickel with respect to the cathode active material of the waste lithium secondary battery may be 60% or more, preferably 80% or more, more preferably 85% or more, most preferably 90% or more, and In particular, the method can exhibit a nickel recovery rate of 80% or more even under a high-concentration nickel condition with a high nickel content included in the cathode active material of a waste lithium secondary battery. The purity of nickel recovered through the method for preparing the cathode active material precursor material according to the present disclosure is preferably 99% or more.

(3) Obtaining an Additional Cathode Active Material Precursor Material

The method for preparing a cathode active material precursor material according to the present disclosure may include extracting manganese and/or extracting cobalt before and/or after step (1) and/or step (2).

Specifically, the step of extracting manganese includes obtaining a manganese (Mn) salt by solvent-extracting a leachate containing manganese, using a phosphoric acid-based material, at pH 3 to 4, wherein the manganese salt includes manganese sulfate $(MnSO_4)$. The phosphoric acid-based material is a manganese salt extractant, and may include a material capable of extracting the Mn salt with an efficiency of 80% or more when the pH of the leachate is 3 to 4, preferably, pH 3.5 to 4, more preferably, pH 4. The extraction efficiency of the Mn salt may be 80% or more, preferably, 85% or more, more preferably, 90% or more, the phosphoric acid-based material may he one that includes, for example, di-(2-ethylhexyl)phosphoric acid (D2EHPA) or 2-ethylhexyl phosphonic acid mono 2-ethylhexyl ester (PC88A), preferably di-(2-ethylhexyl) phosphoric acid.

The extracting of manganese may be included in a step after step (1) and before step (2).

Specifically, the step of extracting cobalt includes obtaining a cobalt (Co) salt by solvent-extracting a leachate containing cobalt, using a phosphoric acid-based material, at pH 4 to 5, wherein the cobalt salt includes cobalt sulfate $(CoSO_4)$. The phosphoric acid-based material is a cobalt salt extractant, and may include a material capable of extracting the Co salt with an efficiency of 80% or more when the pH of the leachate is 4 to 5, preferably, pH 4.5 to 5, more preferably, pH 5. The extraction efficiency of the Co salt may be 80% or more, preferably, 85% or more, more preferably, 90% or more, and the phosphoric acid-based material may be one that includes, for example, di-(2-ethythexyl)phosphoric acid (D2EHPA) or 2-ethylhexyl phosphonic acid mono 2-ethylhexyl ester (PC88A), preferably di-(2-ethylhexyl) phosphoric acid.

Method for Preparing a Cathode Active Material for a Lithium Secondary Battery In addition, the present disclosure provides a method for preparing a cathode active material for a lithium secondary battery, which is characterized in that a cathode active material represented by $LiNi_xCo_yMn_zO_2$ ($0<x'\leq1$, $0\leq y'<1$, $0\leq z'<1$, and $x'+y'+z'=1$) is obtained by mixing lithium salt with the cathode active material precursor material produced by the method for preparing a cathode active material precursor material according to the present disclosure.

The cathode active material prepared according to the present disclosure is not particularly limited as long as it contains nickel or a nickel salt, although it may be a two-component system cathode active material containing nickel and one or more of cobalt and manganese, or a three-component system cathode active material containing nickel, cobalt and manganese.

The lithium salt may include at least one kind selected from the group consisting of lithium carbonate and lithium hydroxide.

In the method of preparing the cathode active material for a lithium secondary battery of the present disclosure, the cathode active material may be prepared according to a known manufacturing method, except that the cathode active material precursor material prepared according to the present disclosure is used.

Cathode Active Material for a Lithium Secondary Battery

The present disclosure provides also a cathode active material for a lithium secondary battery, which is prepared by the method for preparing a cathode active material for a lithium secondary battery according to the present disclosure. The cathode active material for a lithium secondary battery according to the present disclosure may be prepared according to a known manufacturing mehod, except that the cathode active material precursor material prepared according to the present disclosure is used.

DESCRIPTION OF EMBODIMENTS

Hereinafter, the present disclosure will be described in more detail through examples. However, the following examples are intended to illustrate the present disclosure in more detail, and the scope of the present disclosure is not limited by the following examples.

Preparing a Cathode Active Material Precursor Material

As a pretreatment process for nickel recovery, 900 kg of NCM 811, NCM 523, or NCM 111 cathode material separated from the waste lithium secondary battery was crushed and milled to a particle size of 2 μm to 5 μm. After reacting the obtained powder with sulfuric acid solution for 6 hours or more, a leachate containing Li, Mn, Co, and Ni was obtained. Mn was extracted by solvent extraction from the leachate containing Li, Mn, Co, and Ni.

Example 1

1) Preparing 10 w/v % DMG Solution (Saponification 100%)

2.2 equivalents of DMG was used compared to Ni contained in the extraction residual liquid (Ni 29 g/L) from which Mn had been extracted and which had been obtained from the NCM 523 waste lithium secondary battery. About 12.62 g DMG was needed for the precipitation in 100 mL of a 29 g/L Ni solution, and NaOH was first dissolved in about 126 mL DI-Water to make a 10 w/v % DMG solution. At this time, NaOH was used in an amount of 8.69 g, which corresponds to 200% the number of moles of DMG. When the NaOH was completely dissolved in the DI-Water, the DMG was added and dissolved to prepare a 100% saponified DMG solution.

2) Preparing a Nickel Sulfate Solution

The extraction residual liquid from which Mn had been recovered and which had been obtained from the NCM 523 waste lithium secondary battery was adjusted to pH 5.0. Thereafter, while maintaining at 80° C., the previously prepared 100% saponified 10 w/v % DMG solution was added by dropping. Stirring was performed while the temperature was maintained for at least 30 minutes. Upon completion of the reaction, it was cooled down to room temperature and filtered to obtain a precipitate. The precipitate was washed with DI-Water and treated with sulfuric acid to obtain a high-purity nickel sulfate solution.

A process of manufacturing a cathode active material precursor material according to an embodiment of the present disclosure is shown in FIG. 1.

Example 2

1) Preparing 20 w/v % DMG Solution (Saponification 100%)

2.2 equivalents of DMG was used compared to Ni contained in the extraction residual liquid (Ni 29 g/L) from which Mn had been extracted and which had been obtained from the NCM 523 waste lithium secondary battery. About 12.62 g DMG was needed for the precipitation in 100 mL of a 29 g/L Ni solution, and NaOH was first dissolved in about 63 mL DI-Water to make a 20 w/v % DMG solution. At this time, NaOH was used in an amount of 8.69 g, which corresponds to 200% the number of moles of DMG. When the NaOH was completely dissolved in the DI-Water, the DMG was added and dissolved to prepare a 100% saponified DMG solution.

2) Preparing a Nickel Sulfate Solution

A high-purity nickel sulfate solution was obtained in the same manner as in Example 1 above, except that the prepared 100% saponified 20 w/v % DMG solution was used.

Example 3

1) Preparing 10 w/v % DMG Solution (Saponification 50%)

2.2 equivalents of DMG was used compared to Ni contained in the extraction residual liquid (Ni 29 g/L) from which the Mn had been extracted and which had been obtained from the NCM 523 waste lithium secondary battery. About 12.62 g DMG was needed for the precipitation in 100 mL of a 29 g/L Ni solution, arid NaOH was first dissolved in about 126 mL DI-Water (deionized water) to make a 10 w/v % DMG solution. At this time, NaOH was used in an amount of 4.34 g, which corresponds to 100% the number of moles of DMG. When the NaOH was completely dissolved in the DI-Water, the DMG was added and dissolved to obtain a saponified 50% DMG solution.

2) Preparing a Nickel Sulfate Solution

A high-purity nickel sulfate solution was obtained in the same manner as in Example 1 above, except that the prepared 50% saponified 10 w/v % DMG solution was used.

Example 4

1) Preparing 10 w/v % DMG Solution (Saponification 100%)

2.2 equivalents of DMG was used compared to Ni contained in the extraction residual liquid (Ni 47 g/L) from which Mn had been extracted and which had been obtained from the NCM 811 waste lithium secondary battery. About 20.46 g DMG was needed for the precipitation in 100 mL of a 47 g/L Ni solution, and NaOH was first dissolved in about 204 mL DI-Water to make a 10 w/v % DMG solution. At this time, NaOH was used in an amount of 13.6 g, which corresponds to 200% the number of moles of DMG. When the NaOH was completely dissolved in the DI-Water, the DMG was added and dissolved to prepare a 100% saponified DMG solution.

2) Preparing a Nickel Sulfate Solution

A high-purity nickel sulfate solution was obtained in the same manner as in Example 1, except that the extraction residual liquid (Ni 47 g/L) obtained from the NCM 811 waste lithium secondary battery was used.

Example 5

1) Preparing 10 w/v % DMG Solution (Saponification 50%)

2.2 equivalents of DMG was used compared to Ni contained in the extraction residual liquid (Ni 47 g/L) from which the Mn had been extracted and which had been obtained from NCM 811 waste lithium secondary battery. About 20.46 g DMG was needed for the precipitation in 100 mL of a 47 g/L Ni solution, and NaOH was first dissolved in about 204 mL DI-Water (deionized water) to make a 10 w/v % DMG solution. At this time, NaOH was used in an amount of 6.8 g, which corresponds to 100% the number of moles of DMG. When the NaOH was completely dissolved in the DI-Water, the DMG was added and dissolved to obtain a saponified 50% DMG solution.

2) Preparing a Nickel Sulfate Solution

A high-purity nickel sulfate solution was obtained in the same manner as in Example 1, except that the extraction residual liquid (Ni 47 g/L) obtained from the NCM 811 waste lithium secondary battery was used and the prepared 50% saponified 10 w/v % DMG solution was used.

Comparative Example 1

1) Preparing 1 w/v % DMG Solution (Saponification 0%)

2.2 equivalents of DMG was used compared to Ni contained in the extraction residual liquid (Ni 9.66 g/L) from which Mn had been extracted and which had been obtained from the NCM 111 waste lithium secondary battery. 4.2 g DMG was used for the precipitation in 100 mL of a 9.66 g/L Ni solution, and this was dissolved in ethanol to prepare an about 1 w/v % DMG solution.

2) Preparing a Nickel Sulfate Solution

A high-purity nickel sulfate solution was obtained in the same manner as in Example 1, except that the extraction residual liquid (Ni 9.66 g/L) obtained from the NCM 111 waste lithium secondary battery was used and the prepared 1 w/v % DMG solution was used.

Comparative Example 2

1) Preparing 1 w/v % DMG Solution (Saponification 0%)

2.2 equivalents of DMG was used compared to Ni contained in the extraction residual liquid (Ni 29 g/L) from which Mn had been extracted and which had been obtained from the NCM 523 waste lithium secondary battery. About 12.62 g DMG was used for the precipitation in 100 mL of a 29 g/L Ni solution, and this was dissolved in ethanol to prepare an about 1 w/v % DMG solution.

2) Preparing a Nickel Sulfate Solution

A high-purity nickel sulfate solution was obtained in the same manner as in Example 1 above, except that the prepared 1 w/v % DMG solution was used.

The recovery rates and purities of nickel obtained through Examples 1 to 5 and Comparative Examples 1 and 2 are shown in Table 1 below.

TABLE 1

| | Waste battery | DMG concentration | Saponi- fication | Ni recovery rate | Ni purity |
|---|---|---|---|---|---|
| Example 1 | NCM 523 | 10 w/v % | 100% | 90% | 99.95% |
| Example 2 | NCM 523 | 20 w/v % | 100% | 89% | 99.94% |
| Example 3 | NCM 523 | 10 w/v % | 50% | 89% | 99.93% |
| Example 4 | NCM 811 | 10 w/v % | 100% | 89% | 99.94% |
| Example 5 | NCM 811 | 10 w/v % | 50% | 67% | 99.93% |
| Comparative Example 1 | NCM 111 | 1 w/v % | 0% | 88% | 99.94% |
| Comparative example 2 | NCM 523 | 1 w/v % | 0% | 16% | 99.93% |

Referring to Table 1, it can be seen that when DMG is saponified to 50% or more, high purity nickel of 99% or more can be obtained with a recovery rate of 89% or more even from the extraction residual liquid obtained from a waste battery containing high concentration nickel.

Contrarily, it can be seen that in the case of using non-saponified DMG, when nickel was recovered from a low-nickel-content waste battery, the recovery rate was 88%, whereas when nickel was extracted from a high-nickel-content battery, the nickel recovery rate was 16% which was a significantly low value.

The invention claimed is:

1. A method for preparing a cathode active material precursor material using a waste lithium secondary battery, the method comprising:
   (1) leaching a cathode active material of the waste lithium secondary battery to obtain a leachate; and
   (2) mixing a polar solvent and an alkaline solution and then dissolving an oxime-based material to form a saponified oxime-based material that is saponified to 50% or more; and
   (3) precipitating nickel by adding 2 to 20 w/v % of a saponified oxime-based material to the leachate.

2. The method of claim 1, wherein the cathode active material of the waste lithium secondary battery includes a cathode active material represented by Formula 1:

$$LiNi_xCo_yMn_zO_2 \qquad \text{[Formula 1]}$$

wherein $0.5 \leq x \leq 1$, $0 \leq y \leq 0.3$, $0 \leq z \leq 0.3$, and $x+y+z=1$.

3. The method of claim 1, further comprising extracting manganese from the leachate after step (1) and before step (2).

4. The method of claim 1, wherein the oxime-based material includes one or more kinds selected from the group consisting of dimethylglyoxime, diethylglyoxime, dipropylglyoxime, and ethylmethylglyoxime.

5. The method of claim 1, wherein the alkaline solution includes at least one kind selected from the group consisting of NaOH, KOH, Ca(OH)$_2$, and NH$_4$OH.

6. The method of claim 1, wherein the polar solvent includes at least one kind selected from the group consisting of water, alcohol, acetone, and carboxylic acid.

7. The method of claim 1, further comprising obtaining nickel sulfate by treating the precipitated nickel with sulfuric acid in step (3).

8. The method of claim 1, wherein the cathode active material of the waste lithium secondary battery is obtained by crushing the waste lithium secondary battery and then heat-treating the crushed waste lithium secondary battery.

9. The method of claim 1, comprising obtaining a cathode active material represented by the following formula by mixing lithium salt with a cathode active material precursor material prepared by the method according to claim 1:

$$LiNi_{x'}Co_{y'}Mn_{z'}O_2$$

wherein $0 < x' \leq 1$, $0 \leq y' < 1$, $0 \leq z' < 1$, and $x'+y'+z'=1$.

* * * * *